US008843599B2

(12) United States Patent
Pope et al.

(10) Patent No.: US 8,843,599 B2
(45) Date of Patent: Sep. 23, 2014

(54) STORING AND SYNCHRONIZING MEDIA DEVICE INFORMATION

(75) Inventors: Nick George Pope, Suwanee, GA (US); Theodore R. Grevers, Jr., Milford, MA (US); Brian Davis, Medford, MA (US); Christopher Adam Maloney, Jamesburg, NJ (US)

(73) Assignee: Cisco Technology, Inc., San Jose, CA (US)

( * ) Notice: Subject to any disclaimer, the term of this patent is extended or adjusted under 35 U.S.C. 154(b) by 478 days.

(21) Appl. No.: 12/824,174

(22) Filed: Jun. 26, 2010

(65) Prior Publication Data

US 2011/0320575 A1    Dec. 29, 2011

(51) Int. Cl.
G06F 15/177    (2006.01)
H04N 21/8543    (2011.01)
H04N 21/858    (2011.01)

(52) U.S. Cl.
CPC ....... *H04N 21/8543* (2013.01); *H04N 21/8586* (2013.01)
USPC .......................................... 709/220

(58) Field of Classification Search
USPC .......................................... 709/220
See application file for complete search history.

(56) References Cited

U.S. PATENT DOCUMENTS

| 7,117,482 | B2 * | 10/2006 | Nguyen et al. | 717/122 |
| 7,149,522 | B2 * | 12/2006 | Koskelainen | 455/435.1 |
| 7,337,405 | B2 * | 2/2008 | Weng et al. | 715/748 |
| 7,873,527 | B2 * | 1/2011 | Dordick et al. | 705/4 |
| 7,877,461 | B1 * | 1/2011 | Rimmer | 709/217 |
| 7,941,824 | B2 * | 5/2011 | Elbarky | 725/93 |
| 8,015,271 | B2 * | 9/2011 | Mckeown et al. | 709/223 |
| 2003/0158897 | A1 * | 8/2003 | Ben-Natan et al. | 709/204 |
| 2005/0108418 | A1 * | 5/2005 | Bedi et al. | 709/232 |
| 2005/0177745 | A1 * | 8/2005 | Oswald et al. | 713/201 |
| 2005/0177853 | A1 * | 8/2005 | Williams et al. | 725/81 |
| 2006/0123010 | A1 * | 6/2006 | Landry et al. | 707/10 |
| 2008/0071912 | A1 * | 3/2008 | Moore et al. | 709/227 |
| 2008/0305832 | A1 * | 12/2008 | Greenberg | 455/557 |
| 2009/0049506 | A1 * | 2/2009 | White et al. | 725/142 |
| 2010/0146567 | A1 * | 6/2010 | Mehta et al. | 725/91 |
| 2010/0158476 | A1 * | 6/2010 | Hao et al. | 386/83 |
| 2010/0263009 | A1 * | 10/2010 | Meuninck et al. | 725/110 |
| 2011/0202956 | A1 * | 8/2011 | Connelly et al. | 725/38 |
| 2011/0296154 | A1 * | 12/2011 | Chien | 713/2 |

OTHER PUBLICATIONS

Eschenauer, L., XEP-: PEP Inbox, Apr. 9, 2010, Vodafone Group R&D, 02, pp. 1-6.*

* cited by examiner

*Primary Examiner* — Alicia Baturay
(74) *Attorney, Agent, or Firm* — Meunier Carlin & Curfman, LLC

(57) ABSTRACT

Systems, devices, and methods for storing and synchronizing data using Extensible Messaging and Presence Protocol (XMPP), Session Initiation Protocol (SIP) or any other protocol that provides for authentication, presence and messaging. One such method is performed in a digital media device, such as a set top. Device and user-configured settings associated with a digital media device may be saved to a network. The settings may be synchronized with other devices of a user, or used to configure a newly provisioned replacement digital media device. The settings may include pointers to network resources where content is stored such that content need not be transferred from an old or failed digital media device to the newly provisioned digital media device.

14 Claims, 4 Drawing Sheets

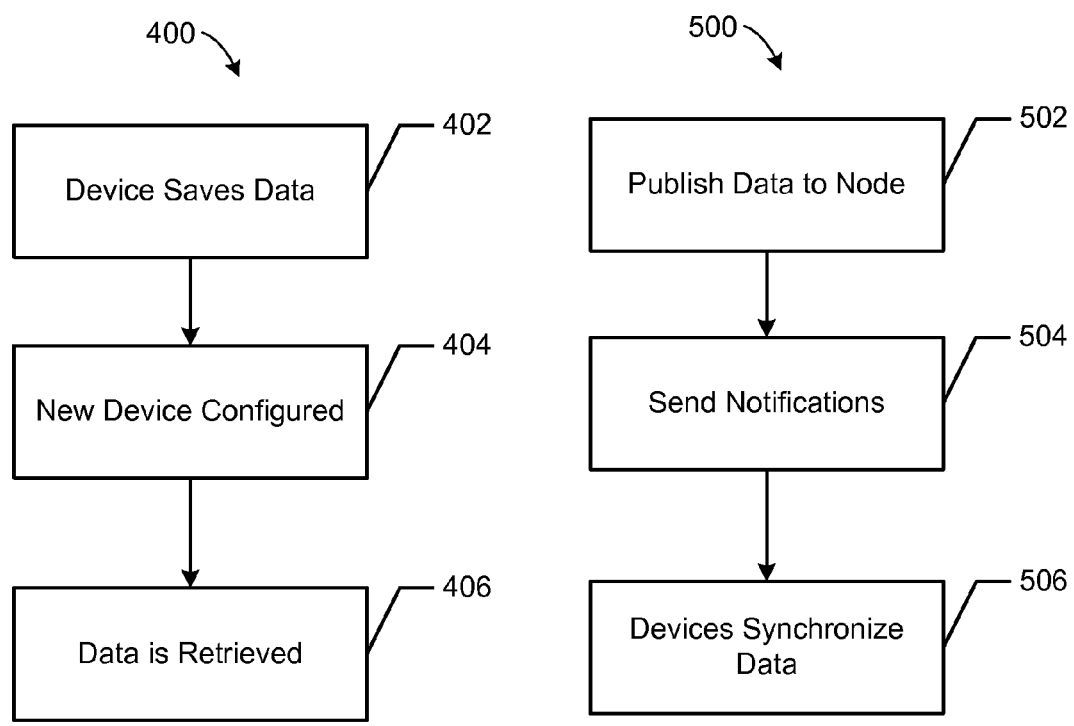

STORING AND SYNCHRONIZING MEDIA DEVICE INFORMATION

BACKGROUND

In managed video systems, whether traditional digital systems or Internet Protocol television (IPTV) systems, service providers lack the ability to provide a smooth transition mechanism when replacing a media device (e.g., a set top box (STB)) in a consumer's home. With current systems, if a media device needs to be replaced, any custom settings the user may have made and content which was stored on the device (e.g., recorded content) is not transferred (unless manually—if possible) to the new device, and thus are effectively lost. This makes for a frustrating customer experience.

SUMMARY

Systems, devices, and methods for storing and synchronizing data using Extensible Messaging and Presence Protocol (XMPP), Session Initiation Protocol (SIP) or any other protocol that provides for authentication, presence and messaging. One such method is performed in a digital media device, such as a set top box.

In accordance with some implementations, there is provided a method of storing configuration settings of a media device in a network for later replacement by a second media device. The method may include saving configuration data to the network, configuring the second media device to be entitled to obtain the configuration data from the network, and retrieving the configuration data from the network. The configuration data saved may include a pointer to information stored on the network and available on the media device.

In accordance with some implementations, there is provided a method of synchronizing data across devices of a user in a network. The method may include publishing settings to a node, sending a notification from the node, and synchronizing the settings to all devices of the user.

This summary is provided to introduce a selection of concepts in a simplified form that are further described below in the detailed description. This summary is not intended to identify key features or essential features of the claimed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 4 is an exemplary operation flow diagram of processes performed to store and retrieve settings and content associated with a device.

FIG. 5 is an exemplary operation flow diagram of processes performed to provide synchronization of settings and content.

DETAILED DESCRIPTION

Implementations are disclosed herein that provide systems, devices, and methods for storing and synchronizing data using Extensible Messaging and Presence Protocol (XMPP), Session Initiation Protocol (SIP) or any other protocol that provides for authentication, presence and messaging. One such method is performed in a digital media device, such as a set top box.

Figure 1:
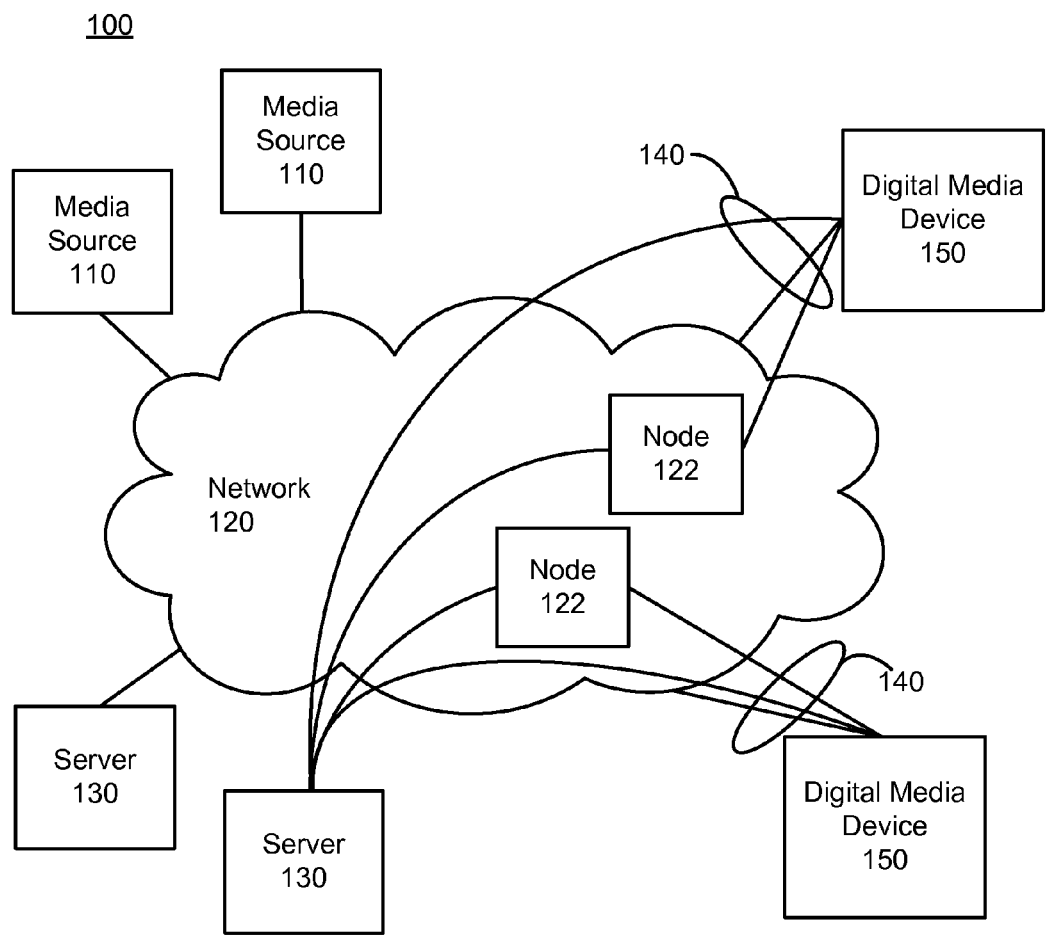
FIG. 1 is a block diagram of an environment in which implementations of the present disclosure may be provided.

FIG. 1 is a block diagram of an environment in which implementations of the present disclosure may be provided. The system 100 may deliver various digital television, data, voice and video services to subscribers, which may include television programming, video-on-demand, pay-per-view, music, Internet access, applications, shopping, and telephone. The television services may be provided from various sources, such as a media source 110, which provides or transmits encoded media content in, for instance, a cable television network, a television services network, or originally from a broadcast television station. Other sources of media content or television services should be familiar to a person of ordinary skill in the art, and are intended to be within the scope of this disclosure.

Various media content sources may be located at a facility known as a "headend" which is operated by a television services provider (e.g., a network operator) that also may operate a network 120. The media source 110 may be part of the network 120. However, these components are not limited to residing at that location. The media content or video programs of television services, from various sources, are provided over network 120 to a digital media device(s) 150, which may include set top boxes, media center devices, personal computers (e.g., WINDOWS, MAC and/or Linux) mobile connected devices, etc.

In general, a content provider (not shown) provides content to one or more headends, which in turn communicate one or more hubs, nodes and taps in the network 120. In one example, fiber optic cable may be used to transmit optical signals from the hubs to the nodes. The optical signal may be converted to an RF signal at the node and transmitted to the tap and ultimately to the digital media device 150 by coaxial cable.

In some implementations, the network 120 may be an ATM or Ethernet network that includes an access node. The access node may connect to a residential gateway at a subscriber's premises. The residential gateway may be managed or unmanaged. One or more digital media receiver(s) 150 within the premises may be connected to the residential gateway via an IP connection to provide digital television, data and voice services. The network 120 may be an IP network that handles all types of traffic (video, data, voice, etc.). Quality of service (QoS) tools can prioritize the video traffic to prevent delay or fragmentation of the signal.

Common encoding and/or container formats for the content transported in the network 120 may include MPEG-2 video, H.264, MP4, or SMPTE VC-1, but others are contemplated to be within the scope of this disclosure.

In some implementations, network content (e.g., the Internet) may be provided to the digital media device 150. The content may be accessed at a server identified by a Uniform Resource Locator (URL) or Internet Protocol (IP) address, and downloaded from a network location to the digital media device 150. The content may be any type of data, including, but not limited to, multimedia content, audio, applications, interactive content, Web content, etc. The content may be made available by a service provider of the network 120 or from other sources.

The digital media device 150 receives, via the subscriber connection 140, the subset of video programs and services to which the subscriber subscribes. The digital media device 150 may select one or more of the delivered television services for presentation to a user (e.g., by "tuning" to a program). In some implementations, the digital media device 150 processes the one or more multiplexed media streams corresponding to the video program of the selected television service and converts them into a presentable or output form, such as a video signal, either in analog form or digital form. Processing may comprise decompression and reconstruction of the pictures in a received video stream. This video signal is supplied to a display (e.g., a television or computer monitor) for viewing by a subscriber. In some implementations, the digital media device 150 stores the video program of the selected television service for later presentation (e.g., digital video recorder or DVR).

In some implementations, the digital media device 150 may access and receive network content from, e.g., the Internet or other network location. As noted above, the network content may be any type of data. The data may be downloaded by a subscriber using the digital media device 150, or may be provided to the digital media device 150 by a service provider.

In some implementations, the digital media device 150 publishes certain items of information to a "publish-subscribe" (PubSub) node or Personal Event Protocol (PEP) node 122 via the subscriber connection 140. The node 122 may be an entity defined by XEP-0271: XMPP Nodes (published by the XMPP Standards Foundation), which identifies a particular facet or aspect of an XMPP domain, localpart, or resource. The node 122 may implement aspects of a "publish-subscribe" (PubSub) model where a person or application publishes information, and an event notification (with or without payload) is broadcasted to all authorized subscribers.

In general, the relationship between the publisher and subscriber may be mediated by a service that receives publication requests, broadcasts event notifications to subscribers, and enables privileged entities to manage lists of people or applications that are authorized to publish or subscribe. The focal point for publication and subscription is a "node" (i.e., node 122) to which publishers send data and from which subscribers receive notifications. Nodes can also maintain a history of events and provide other services.

The nodes 122 may be organized in a hierarchical (tree structure) and be one of two types. Leaf nodes are nodes that contain published items. Collection nodes are nodes that contain other nodes. Thus, when a user subscribes to the node 122, that node may be a leaf node where notifications are sent when new items are published to the node. Otherwise, the node 122 is a collection node, and notifications are made on addition/removal of child nodes or when new items are published to child nodes.

In other implementations, the digital media device 150 may subscribe to publications from the node 122. In such implementations, when information is published by the node 122, the digital media device 150 may receive notifications of new/update information via the subscriber connection 140.

A server 130 may provide messaging, presence, XML routing features, content, applications, data, etc. In some implementations, the server 130 may provide multimedia to the digital media device 150 for viewing by a subscriber. For example, the server 130 may be operated by a service that provides on-demand access to multimedia content. In some implementations, the server 130 may be located on the managed or unmanaged network and may be a Web server, FTP server, etc., that serves content, applications, data, etc. to the digital media device 150.

In some implementations, the server 130 may be a subscriber or publisher in a PubSub service. In other implementations, the server 130 may be a diagnostic component that initiates a command session with, e.g., the digital media device 150 to perform maintenance. In yet other implementations, the server 130 may be a storage component that stores private and/or public information, such as a configuration of the digital media device 150. In some implementations, the server 130 may use XMPP, SIP, or any other protocol that provides for authentication, presence and messaging.

In some implementations, the server 130 may be an aggregator or a harvester. The aggregator may be a device that receives raw media events from a PEP node 122 that subscribes to a digital media device 150. The aggregator may store and send the raw events to the harvester, or send the raw media events to the harvester as they are received from the digital media device(s) 150. The harvester may also pull the raw media events from the aggregator. The harvester reformats the raw media events to remove some data; or other data might be changed to protect the identity of the service provider's subscribers. In some implementations, the harvester may change the data from one XML format to another XML format. The harvester may then send the reformatted data to one or more analysis systems, or alternatively, the analysis systems may pull in the information from the harvester. The relationships of harvesters to aggregators to PEP nodes may be changed to scale up or scale down the numbers of servers 130 needed to collect the raw media events in a service providers' system. Thus, aggregators and harvesters may be added and subtracted, as needed. Further, the connectivities between the aggregators and harvesters may also be altered, as needed.

While the subscriber connection 140 is shown as plural connections to the network 120, the node 122 and the server 130, it is noted that the subscriber connection 140 may be one physical connection, such as a coaxial cable, Ethernet, fiber optic, or other physical media.

Figure 2:
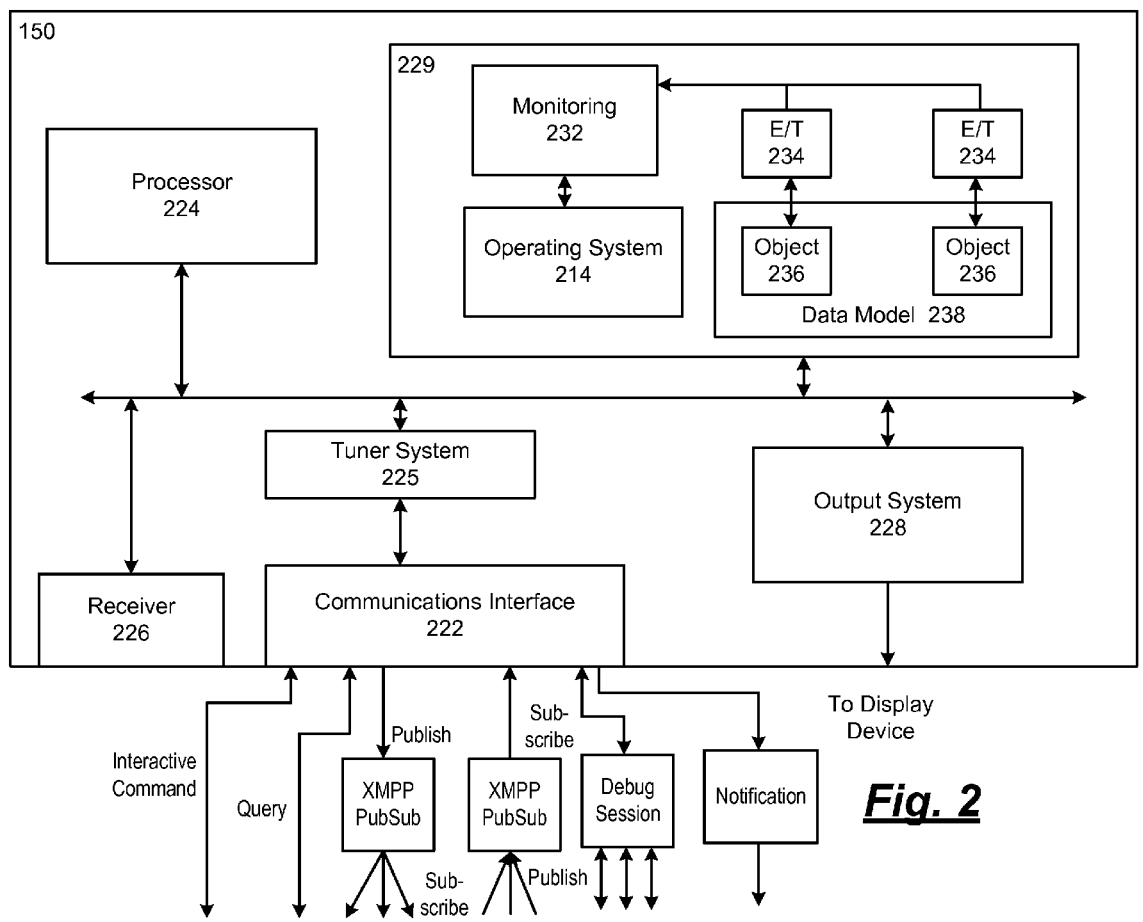
FIG. 2 is a block diagram depicting a non-limiting example of the digital media device.

FIG. 2 is a block diagram depicting a non-limiting example of the digital media device 150. The digital media device 150 described herein is merely illustrative and should not be construed as implying any limitations upon the scope of the present invention. The digital media device 150 preferably includes a communications interface 222 for receiving signals (video, audio and/or data) from the headend within the network 120.

The digital media device 150 further includes at least one processor 224 for controlling operations of the digital media device 150, an output system 228 for driving a display device, and a tuner system 225 for tuning to a particular television channel to be displayed and for sending and receiving various types of data or media to/from the headend. The tuner system 225 includes, in one implementation, an out-of-band tuner for bi-directional Quadrature phase shift keying (QPSK) data communication and a Quadrature amplitude modulation (QAM) tuner for receiving television signals. Additionally, a receiver 226 receives externally-generated user inputs or commands from an input device such as, for example, a remote control device.

The processor 224 may provide for functions such as decoding, transcoding/encoding (converting from one format to another) and transrating (scaling from a higher to a lower bit rate) of various media streams, as well as having the ability to accommodate system-level functions such as decryption, encryption, packetization and transport of media streams. Besides broadcast content, the digital media device 150 may support content received from a home network or the Internet.

The communications interface 222 of the digital media device 150 may also include one or more wireless or wired interfaces (not shown), also called ports, for receiving and/or transmitting data to other devices. For instance, the digital media device 150 may feature a USB (Universal Serial Bus), an Ethernet port (for connection to a computer or network), an IEEE-1394 connection (for connecting to consumer electronics equipment), eSATA port (external Serial Advanced Technology Attachment for attachment of mass storage devices), and a serial port. Wireless interfaces include, but are not limited to, 802.11 (WiFi) 806.16 (WiMax), Bluetooth, Zigee, cellular, etc. User inputs may, for example, be provided via a computer, via buttons or keys located on the exterior of the digital media device 150, via a hand-held remote control device, and/or via a keyboard that includes user-actuated buttons, etc.

In one implementation, a system memory 229 may be provided within which various applications, modules and data may be stored for execution and use by the processor 224. Basic functionality of the digital media device 150 is provided by an operating system 214 that coordinates the resources of the digital media device 150 such as, for example, computing resources. One or more applications, may be executed by utilizing the computing resources in the digital media device 150. Applications stored in the system memory 229 are executed by processor 224 (e.g., a central processing unit or digital signal processor) under the auspices of the operating system 214.

Data required as input by an application is stored in the system memory 229, and read by processor 224 as need be during the course of the application's execution. Input data may be data stored in system memory 229 by a secondary application or other source, either internal or external to the digital media device 150, or possibly anticipated by the application and thus created with the application at the time it was generated as a software application. Data generated by an application is stored in system memory 229 by the processor 224 during the course of the application's execution.

In some implementations, the digital media device 150 may implement a monitoring agent 232 that interfaces with the operating system 214 and monitors one or more event/triggers 234. The monitoring agent 232 may monitor media events, diagnostic events, or other events within the digital media device 150. The event/triggers 234 respond to a defined set of expressions to set triggers on objects 236 within a data model 238. When a trigger is tripped, one or more events occur. Events may be actions, such as starting logging, generating notifications, performing a core dump, etc. Notifications may be small messages that are communicated over the network 120 to various recipients by the monitoring agent 232.

In accordance with some implementations, the communications interface 222 may be configured to provide for communications using various extensions of XMPP. XMPP is an XML-based protocol that provides messaging and presence information. XMPP operates behind a router and passes through network access translation (NAT) gateway devices. Thus, if the client is behind a NAT and/or Firewall gateway, in e.g., in a home, XMPP can be used to traverse the router to enable communications between the client and server. The extensions may be implemented to provide various capabilities to the digital media device 150. For example, the digital media device 150 may subscribe to events (e.g., geographically relevant events) or publish information about the digital media device 150 for collection (e.g., usage and behavior information). The digital media device 150 may be remotely commanded, queried or debugged by, e.g., the server 130 to perform diagnostic operations, report health and status, and to track state information. The digital media device 150 may report state information to the server 130. The digital media device 150 may also save information to the XMPP core network or and/or synchronize with another digital media device 150. Other features may be implemented in accordance with the XMPP extensions.

Figure 3:
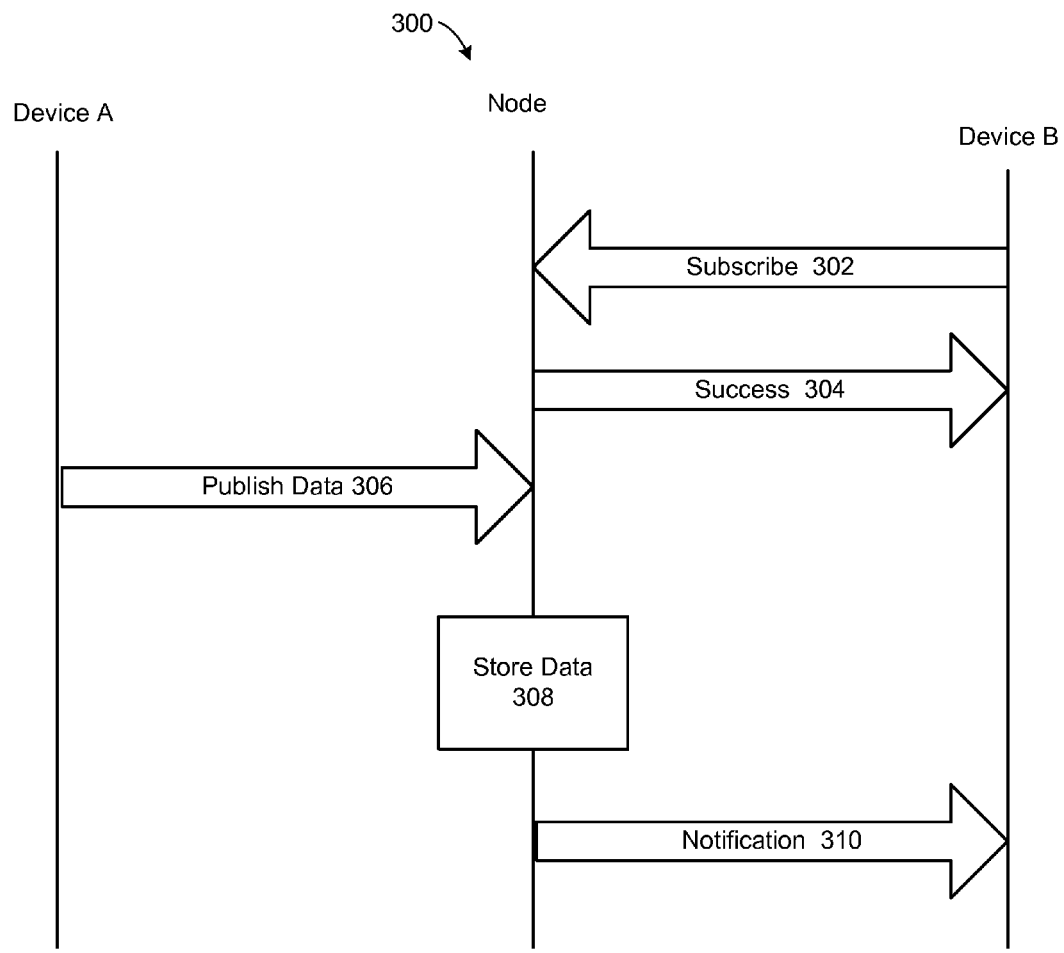
FIG. 3 is a diagram illustrating aspects of message flows between a publisher, a node and a subscriber that may be used for synchronization of data.

FIG. 3 is a diagram illustrating aspects of message flows 300 between a publisher, a node and a subscriber that may be used for synchronization of data. In some implementations the publisher, the node and the subscriber communicate based on RFC 3920 (Extensible Messaging and Presence Protocol (XMPP): Core) and RFC 3921 (Extensible Messaging and Presence Protocol (XMPP):Instant Messaging and Presence). A client's session with a server may be viewed as XML streams and XML stanzas. The XML stream acts as an envelope for all the XML stanzas sent during a session. This may be represented as:

```
<stream>
    <presence>
        <show/>
    </presence>
    <message to='foo'>
        <body/>
    </message>
    <iq to='bar'>
        <query/>
    </iq>
    ...
</stream>
```

The attributes of the stream element are 'to,' which is used from initiating entity to the receiving entity. The 'from' attribute is used by the receiving entity to the initiating entity. The 'id' attribute is from the receiving entity to the initiating entity and is a unique identifier created by the receiving entity to function as a session key for the initiating entity's streams with the receiving entity. An 'xml:lang' attribute specifies the default language of any human-readable XML character data sent over that stream. The 'version' attribute is set to a value of at least "1.0" and signals support for the stream-related protocols.

In FIG. 3, it is assumed that Device B has authenticated with an XMPP core server and that binding has taken place. To subscribe to the node, the Device B sends a subscription request 302 to the PEP service node. In the subscription request, a <pubsub/> element contains a <subscribe/> element. The <subscribe/> element possesses a 'node' attribute specifying the node to which the entity wishes to subscribe. The <subscribe/> element also includes a 'jid' attribute specifying the XMPP address to be used as the subscribed ID. If the subscription request is successfully processed, the node informs the requesting entity that it is now subscribed with a success message 304.

Any entity that is allowed to publish items to the node (e.g., Device A) may do so at any time by sending an IQ-set 306 to the service containing a pubsub element with a <publish/> child. The data (private or public) is stored at 308 at the PEP node. The node then sends one <message/> stanza containing an event notification 310 to each subscriber, which includes Device B, as the device may logged on under the same user as Device A or may be authorized to receive the data published by the Device A.

FIG. 4 is an exemplary operation flow diagram of processes 400 performed to store and retrieve settings and content associated with a device. XMPP provides a number of extensions which provide the capability to store XML data in the XMPP core network. The processes 400 may be implemented using XMPP extensions XEP-0049: Private XML Storage (published by the XMPP Standards Foundation). This data may consist of digital media device specific information, e.g., audio/visual settings, network settings, application specific settings or device specific settings. In addition to these user-configured settings, this data can also include URLs (e.g., pointers) to content that has been previously recorded or downloaded to the device. This allows a replacement digital media device 150 to subsequently download the content from the network, for later use by the consumer.

At 402, the device saves configuration data. For example, to save specific configuration parameters, the digital media device 150 may periodically, or upon predetermined events, save a current working configuration to the XMPP core using XEP-0049. The device may store any arbitrary XML on the server side by sending an <iq/> stanza of type "set" to the server with a <query/> child scoped by the 'jabber:iq:private' namespace.

At 404, a new device is configured. If the digital media device 150 needs to be replaced, a new digital media device 150 may be configured and/or entitled to obtain the data that was owned by the previous digital media device 150. In some implementations, the new digital media device 150 is configured using pointers to previously recorded content and information that was available on the old digital media device 150. As such, the content and information may be stored on the network 120 and need not be transferred from the old to new digital media device 150. Rather, the content and information can be retrieved by configuring the new digital media device 150 with the pointers to the content and information where it resides on the network 120.

At 406, the data is retrieved. Once entitled, the new digital media device 150 may log on to the XMPP Core, and request the content and settings from the previous digital media device 150. The data may be retrieved by sending an <iq/> stanza of type "get" with a <query/> child scoped by the 'jabber:iq:private' namespace, which in turn contains a child element scoped by the namespace used for storage of that fragment. The new digital media device 150 may either re-record or retrieve the content and information on the network 120 by using the previously configured and saved pointers from the old digital media device 150.

Thus, in accordance with the processes 400, user and device settings, as well as content (e.g., multimedia, applications and data) can be saved in a deployed digital media device and retrieved for use in a new digital media device that may replace a deployed device.

In addition to device specific data, user-specific settings may apply across multiple devices for, e.g., synchronization. These types of settings may be, e.g., a Favorites list or playlists. FIG. 5 is an exemplary operation flow diagram of processes 500 performed to provide synchronization of settings and content. The processes 500 may be implemented in near real-time by one or more of XMPP extensions XEP-0049: Private XML Storage, XEP-0222: Persistent Storage of Public Data via PubSub and XEP-0223: Persistent Storage of Private Data via PubSub. Each is published by the XMPP Standards Foundation. Public data is data that can be shared among different users. Private data is only retrievable via the user who creates the data.

At 502, the device publishes settings to a node. For example, the digital media device 150 may publish settings to a Personal Eventing Protocol (PEP) node, which is defined by XEP-0163. The settings to be published to the PEP node may be configurable by the user. A PEP node will send notifications of published events to all devices that are logged into the network as the "owner" of that node. Therefore, if device A, for user A, publishes a Favorites list to user A's PEP node, the PEP node will send notifications to all devices which are logging into the network as user A. The publishing device may use the persist_items flag (described in XEP-0222 and XEP-0223) so that these settings can be retrieved by user's A devices which were not online at the time of publishing.

At 504, the node sends notifications. As noted above, all of the user's logged-on devices, as determined from presence information, may receive a notification of publication. In some implementations, devices that log on at a later time are notified. At 506, the devices synchronize the data. When the user's devices receive the notification, the associated message (payload) is ingested and the device data is updated to synchronize with that of the notification. As such, all of the user's devices are synchronized in real-time or when they are powered on/logged on to the network 120.

Thus, the processes 400 and 500 may be used to store and synchronize information to quickly enable a digital media device to be replaced and/or updated with the user's information. Further, the digital media device may be a managed or unmanaged device on a managed or unmanaged network, such as those described above. For example, the processes 400 and/or 500 allow an end-user to store user settings in the network. The settings can be device specific A/V settings and adjustments, network settings, wired/wireless settings, and references (e.g., pointers) to content downloaded or recorded on the device. The Settings may apply to a user across multiple devices, such as favorites and playlists. In addition, the processes 400 and/or 500 provide an ability for multiple devices to synchronize settings in real-time, which may be difficult to do using HTTP.

In the implementations above, the functions of the server 130 and the digital media device 150 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality is partitioned among components. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language.

Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of storing configuration settings of a media device for later replacement by a second media device, comprising:
    saving configuration data to a XMPP core network using an XMPP extension to send XML data to the XMPP core network, the configuration data including pointers to information stored on the network that is available on the media device;
    processing a subscribe request, the second media device being entitled to obtain the configuration data from the network if the subscribe request is successfully processed;
    notifying the second media device of the configuration data;
    retrieving the configuration data from the network;
    sending, by a Personal Eventing Protocol (PEP) node, user settings to all logged-on devices of a particular type that are associated with a user of the second media device.

2. The method of claim 1, further comprising providing the pointers to the second media device.

3. The method of claim 2, wherein the second media device downloads content from the network in accordance with the pointers.

4. The method claim 2, wherein the pointers comprise URLs to content which has been previously recorded or downloaded to the media device.

5. The method of claim 1, further comprising providing application specific information to the second media device.

6. The method of claim 1, further comprising providing media device specific information and user configured settings to the second media device.

7. A method of synchronizing data across devices of a particular type that is associated with a user in a network, comprising:
    publishing user settings to a node in a XMPP core network using an XMPP extension to send XML data to the node, the node being a Personal Eventing Protocol (PEP) node that sends a notification to all logged-on devices of the particular type that are associated with the user;
    saving the settings to the node;
    processing a subscribe request from each of the devices of the particular type that are associated with the user;
    sending a notification from the node; and
    synchronizing the settings to all devices of the particular type that are associated with the user.

8. The method of claim 7, further comprising synchronizing the settings in real-time or as the devices of the particular type that are associated with the user are logged on to the network.

9. The method of claim 8, wherein the settings comprise a Favorites list or playlists.

10. A method of synchronizing user devices in a network, comprising:
    publishing settings of the user devices to a XMPP core network;
    publishing the settings to a Personal Eventing Protocol (PEP) node, wherein the PEP node sends the notification to the user devices;
    saving the settings to the network;
    processing a subscribe request from each of the user devices;
    sending a notification from the network to the user devices in accordance with presence information of the user devices;
    communicating between the user devices and the network using Extensible Messaging and Presence Protocol (XMPP) messages; and
    synchronizing the settings between the user devices.

11. The method of claim 10, further comprising synchronizing the settings in near real-time.

12. The method of claim 10, further comprising:
    determining from the presence information that a user device has authenticated with the network;
    sending the notification to the user device after authentication; and
    synchronizing the settings.

13. The method of claim 12, wherein the settings are synchronized with each user device as the user device authenticates with the network.

14. The method of claim 10, wherein first predetermined settings are published as public data using a publish/subscribe mechanism and wherein second predetermined settings are published as private data using the publish/subscribe mechanism.

* * * * *